A. E. GUSTAFSON.
APPARATUS FOR TESTING BATTERY JARS.
APPLICATION FILED JUNE 22, 1920.
1,370,437.
Patented Mar. 1, 1921.
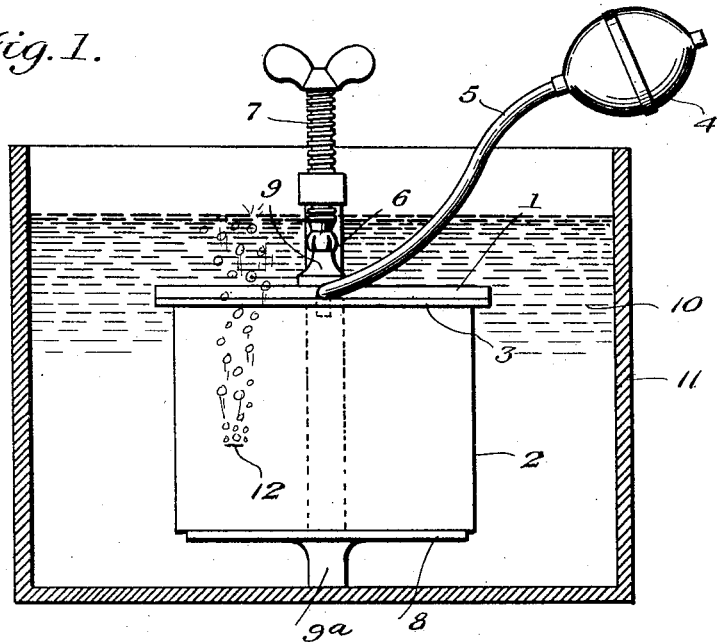
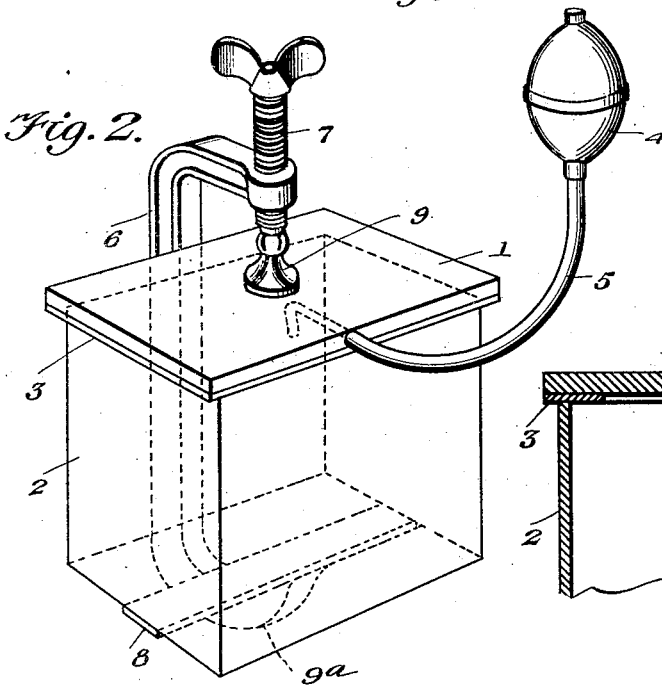
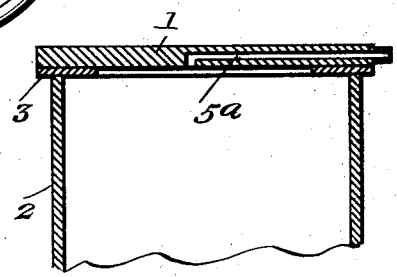
A. E. Gustafson
INVENTOR
BY Victor J. Evans
ATTORNEY

UNITED STATES PATENT OFFICE.

AXEL EDWARD GUSTAFSON, OF CENTERVILLE, SOUTH DAKOTA.

APPARATUS FOR TESTING BATTERY-JARS.

1,370,437.  Specification of Letters Patent.  Patented Mar. 1, 1921.

Application filed June 22, 1920. Serial No. 390,831.

*To all whom it may concern:*

Be it known that I, AXEL EDWARD GUSTAFSON, a citizen of the United States, residing at Centerville, in the county of Turner and State of South Dakota, have invented new and useful Improvements in an Apparatus for Testing Battery-Jars, of which the following is a specification.

My present invention contemplates the provision of an apparatus, whereby a leak in a battery jar may be quickly and effectively detected and located.

To the attainment of the foregoing the invention consists in the improvement as hereinafter described and definitely claimed.

In the accompanying drawings, hereby made a part hereof:—

Figure 1 is view partly in vertical section and partly in elevation, showing my novel apparatus in use.

Fig. 2 is a perspective illustrative of the manner of using the apparatus and practising my invention.

Fig. 3 is a section of the cover plate on the jar.

Similar numerals of reference designate corresponding parts in all of the views of the drawings.

My novel apparatus comprises a cover plate 1, preferably of cast iron, for the rubber jar 2 to be tested for leaks. At its underside and adjacent to its edges the cover plate 1 is provided with a gasket 3 of rubber or other appropriate material so that the jar 2 may be hermetically sealed. The testing apparatus also comprises a bulb 4 or other air compressing means, and a conduit 5 interposed between and connected to the bulb and the conduit 5ª in the plate 1 and adapted to effect communication between the bulb and the sealed jar to be tested. The apparatus also includes clamping means for holding the cover plate 1 under pressure against the jar 2. The said clamping means manifestly may be of any construction compatible with the purpose of my invention without involving departure from the scope of the same as claimed. I prefer, however, to employ a clamp such as illustrated, said clamp being made up of a body 6, a clamping screw 7, and a jar supporting member 8; the latter being about 6 inches long and being designed to be arranged in opposed relation to or carried by an arm 9ª and being spaced from the usual follower 9 at the inner end of screw 7.

In practising my invention and using the novel apparatus illustrated the jar 2 hermetically sealed through the medium of my improvement is immersed in a body of water 10 in a vessel 11. Air is then pumped into the jar, and in the event of the jar being intact there will be no developments in the water. If, however, there is a crack in the jar, say at the point 12, Fig. 1, the air will escape from the jar and in passing upwardly through the water will create bubbles. This obviously will apprise the operator of the defect in the jar and at the same time will enable him to exactly locate the defect.

Having described my invention, what I claim and desire to secure by Letters-Patent, is:—

Apparatus for use in the detection of defects in battery jars, comprising a closure plate having a gasket at its inner side and also having a conduit, clamp means for holding said plate under pressure against the jar to be tested, an air compressing bulb, and a conduit connection between said bulb and plate and arranged to communicate through the conduit in the plate with the interior of a jar closed by the plate.

In testimony whereof I affix my signature.

AXEL EDWARD GUSTAFSON.